United States Patent [19]

Denis

[11] Patent Number: 5,203,802
[45] Date of Patent: Apr. 20, 1993

[54] DEVICE FORMING AN EMPTYING SCREW FOR RESIDUAL PRODUCT STORED IN A SILO

[75] Inventor: Pierre Denis, Brou, France

[73] Assignee: Etablissements DENIS, Brou, France

[21] Appl. No.: 739,174

[22] Filed: Aug. 1, 1991

[30] Foreign Application Priority Data

Aug. 3, 1990 [FR] France ................................. 90 09950

[51] Int. Cl.$^5$ ............................................. B65G 69/08
[52] U.S. Cl. .................................... 414/320; 414/317; 414/322
[58] Field of Search ................ 414/307, 315, 310–312, 414/319–322, 326, 526; 198/303, 306

[56] References Cited

U.S. PATENT DOCUMENTS

| | | | |
|---|---|---|---|
| 2,763,362 | 9/1956 | Greaves | 414/310 X |
| 2,790,563 | 4/1957 | McCarthy | 414/312 |
| 3,289,862 | 12/1966 | Weaver et al. | 414/311 X |
| 3,301,412 | 1/1967 | Buschbom | 414/320 |
| 3,456,818 | 7/1969 | Massey | 414/319 X |
| 3,647,094 | 3/1972 | Jackson | 414/310 X |
| 4,861,216 | 8/1989 | Füllemann et al. | 414/326 |

FOREIGN PATENT DOCUMENTS 1570690 7/1980 United Kingdom ................ 414/312

*Primary Examiner*—David A. Bucci
*Attorney, Agent, or Firm*—Gottlieb, Rackman & Reisman

[57] ABSTRACT

A device for the emptying of the residual product stored in a silo comprises a series of beams, for example, two or three beams. The first beam is mounted pivotably at a first end thereof on a pivot situated at the center of the discharge opening of the silo. Toward its second end, the first beam is articulated via a pivot to a first end of the second beam. If three beams are provided, the second end of the second beam is similarly articulated via a pivot to the first end of the third beam. Each beam supports a rotatable endless screw for feeding the product in the direction of the first end that beam and thus toward the discharge opening of the silo, and bears against the base of the silo via a drivable wheel which enables the beam to be pivotally displaced over the base of the silo. Each beam also carries a motor assembly for driving the endless screw and the wheel associated with that beam.

22 Claims, 2 Drawing Sheets

DEVICE FORMING AN EMPTYING SCREW FOR RESIDUAL PRODUCT STORED IN A SILO

FIELD OF THE INVENTION

The present invention relates to a device forming an emptying screw for the residual product stored in a silo with a substantially flat base and with at least one discharge opening, which device is of the type comprising an endless screw supported in rotation by a beam situated above the base of the silo and parallel to it, said beam being mounted pivotably via one of its ends, called the first or inner end, which is articulated on a pivot situated above the discharge opening, while toward its other end, called second or outer end, the beam bears on the base of the silo via a drive system including a wheel, and a motor assembly for driving the endless screw and the wheel in rotation.

In a silo with a substantially flat base, the stored product runs off by gravity through a central opening and through lateral openings, situated on each side of the former, into a gallery or channel from which it is transported by means of a recovery device and conveyed to the outside of the silo.

In a general manner, the quantity of product which can run off by gravity or gravitational emptying represents overall only about two thirds of the storage capacity of the silo. By way of example, the volume of the residual product reaches about 7000 tons in the case of a hemispherical silo of 48 m diameter whose storage capacity is of the order of 20,000 tons. In other words, the more the storage capacity increases, the more the residual volume increases.

PRIOR ART

In order to extract this residual volume or residual emptying, several solutions have been proposed. One solution consists in resorting to manual labour to move the residual product toward the discharge opening by using shovels. Another traditional solution consists in using pilot-controlled motorized machines which make the work less difficult and more efficient. Finally, one last solution, such as that mentioned in the introduction, consists in using automatic mechanical devices with endless screws.

However, this last solution (pivoting beam with endless screw) presents disadvantages which become greater with the increase in the storage capacity of the silos and the demands of the users as regards output. In practice, this solution becomes unsuitable when the diameter of the silo reaches and exceeds about 30 m. In these circumstances, which are common at present, the abovementioned traditional solutions are reverted to in the end for carrying out the residual emptying.

Indeed, two major problems associated with one another concern the structure of the beam and the power of the motor assembly for driving the endless screw in rotation.

The beam must have a structure which is sufficiently strong to be able to resist the considerable pressures exerted by the product, in particular during gravitational emptying. The more the storage capacity increases, the more the output increases and the greater these pressures become. It is therefore necessary to strengthen the framework of the beam, and this results in an increase in volume, which hampers gravitational emptying, an increase in weight and an increase in cost.

Moreover, the increase in the diameter and the output rates leads to endless screws of ever greater size, and this makes it necessary to increase the power of the motor assembly for starting up the rotation of the endless screw, on account of the counter-resistance from the product in contact with the screw. In practice, a supplementary power of the order of 50% proves necessary for the start-up, the result being a motor assembly which is bulkier and therefore takes up more space.

Furthermore, since the motor assembly is generally situated at the level of the central discharge opening, not only does it create an obstacle to gravitational emptying, but it must also be protected from the high pressures produced during this emptying.

SUMMARY OF THE INVENTION

The invention aims to overcome these disadvantages, and to this end it proposes a device forming an emptying screw for the residual product stored in a silo with a substantially flat base, which device is equipped with a pivoting beam and screw arrangement of the abovementioned type and comprises at least a second beam of overall structure similar to the first beam, with one of its ends, called the inner or first end, mounted pivotably toward the outer or second end of the first beam, whereas toward its other end, called the outer or second end, the second beam bears on the base of the silo via a drive system including a wheel, and wherein two motor assemblies are associated respectively with the two beams.

According to another characteristic of the invention, the two motor assemblies are situated toward the outer ends of the two beams respectively, and each motor assembly comprises two motors which drive respectively the endless screw and the system for driving the associated beam. The discharge of the product is facilitated by virtue of this arrangement, since the opening of the silo is no longer obstructed by the motor assembly of the first beam.

Finally, according to yet another important feature of the invention, means are provided for controlling the pivoting of the second beam relative to the first one when the latter is stationary, as well as means which, conversely, control the pivoting of the first beam relative to the second beam.

In a general manner, and by way of example, in the case of silos having a diameter of the order of 60 m provision is made for three beams, the third beam being mounted at its inner or first end pivotably about a pivot structure supported toward the outer or second end of the second beam in a manner similar to the articulation provided between the first and second beams.

Thus, by dividing the device up into several articulated elementary beams, it is possible to overcome all the inherent disadvantages of a single beam. Moreover, since each motor assembly associated with a beam is divided into two separate motors for driving in rotation the endless screw and the system for driving the beam, and on account of the reduced length of the endless screw, the power and the size of these motors can be significantly reduced.

One important advantage of the invention is that the modular structure of the device leads to a significant reduction in the volume and weight of the device compared to a single-beam device of the same length and the same output, the result of this being a saving in terms of materials and installed power (motor assemblies of lower power) and a reduced cost price, while obtaining an improved efficiency.

BRIEF DESCRIPTION OF THE DRAWINGS

Other advantages, characteristics and details of the invention will emerge from the description which follows and in which reference is made to the attached drawings, which are given solely by way of example and in which.

DESCRIPTION OF THE PREFERRED EMBODIMENT

Figure 1:
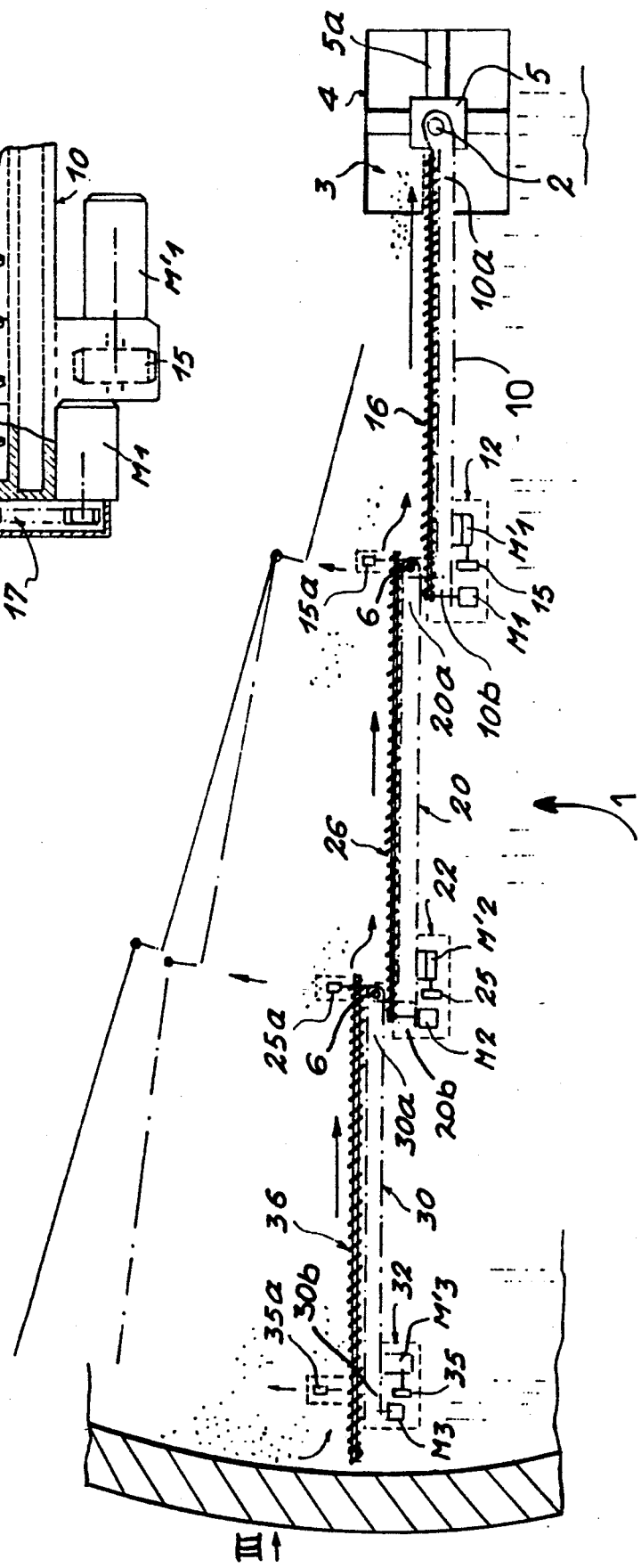
FIG. 1 is a simplified plan view of the device according to the invention.

Referring to FIG. 1, the device 1 forming an emptying screw for the residual product stored in a silo with a substantially flat base comprises, in the example considered here, three beams 10, 20 and 30 placed above the base of the silo and parallel to it, these beams overall having the same structure.

Figure 3:
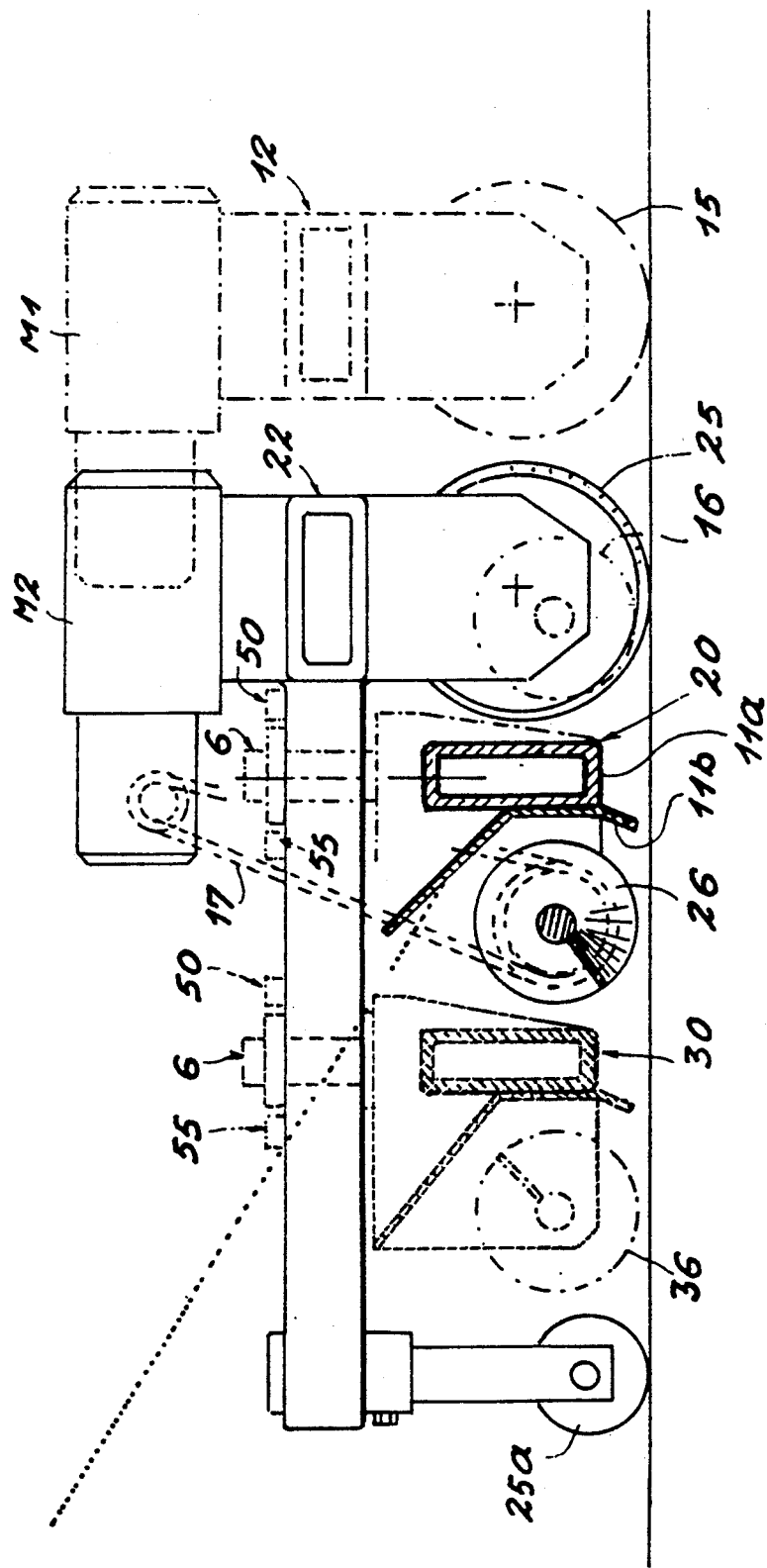
FIG. 3 is an end view in the direction of the arrow III in FIG. 1.

Each beam 10, 20 and 30 consists of a rectilinear metallic core 11a and a rectilinear metallic profiled section 11b which extend substantially over the same length (FIG. 3). The profiled section 11b is fixed with one face against a longitudinal face of the core 11a and parallel to the latter, and it extends over a height of about 30 cm. The upper part of the profiled section 11b is bent forward, that is to say in a direction away from the core 11a. The longitudinal face of the profiled section 11b opposite its face fixed to the core 11a will be referred to as the front face.

The first beam 10 (FIG. 1) is mounted pivotably via one of its ends 10a, called the inner or first end, which is articulated around a pivot structure 2 situated on the whole above the discharge opening 3 provided, for example, at the center of the base of the silo and delimited by a trough 4. The pivot structure 2 is fixed to a support 5 placed at the center of the trough 4 and connected by connection bars 5a to the edges of the trough 4. Toward its other end 10b, called the outer or second end, the beam 10 is supported by a plate 12.

Figure 2:
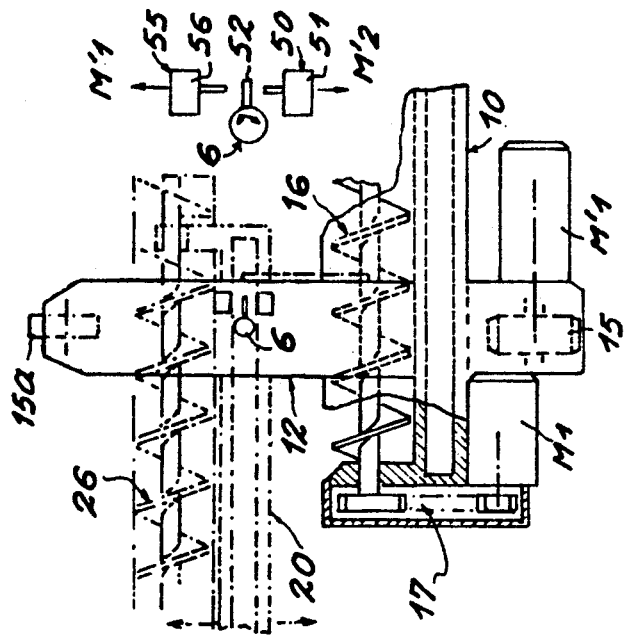
FIG. 2 is a fragmentary enlarged detail view of the structure of the device at the adjacent ends of the first two beams.

This plate 12 (FIGS. 2, 3) supports a motor assembly comprising two electric motors M1 and M'1, and a drive system, such as a wheel 15, via which the beam 10 bears on the base of the silo. The axis of rotation of the wheel 15 is substantially parallel to the beam 10, in such a way as to permit the pivoting movement of the latter, and it is connected to the output shaft of the motor M'1.

The first beam 10 supports in rotation an endless screw 16 borne by bearings fixed to the front face of the profiled section 11b, said screw extending parallel to the beam. At its inner end, the endless screw 16 over-hangs the discharge opening 3 in such a way that the product which it conveys runs out through this opening. Toward its other end, the axis of the endless screw 16 is coupled to the output shaft of the motor M1 by a pinion and chain system 17, for example.

The second and third beams 20 and 30 have a structure analogous to that of the first beam 10. In other words, all the following elements are once again present: two metallic profiled sections 11a and 11b, two plates 22 and 32 which support the so-called outer ends 20b and 30b of the beams 20 and 30, two motor assemblies, each comprising two electric motors M2, M'2, and M3, M'3, two drive systems 25 and 35 for the beams 20 and 30 controlled by the motors M'2 and M'3, and two endless screws 26 and 36 driven in rotation by the motors M2 and M3, respectively.

Toward its so-called inner end 20a, the beam 20 is mounted in articulated fashion via auxiliary pivot structure 6 supported in rotation by the plate 12 of the first beam 10, while toward its so-called inner end 30a, the beam 30 is mounted in articulated fashion via auxiliary pivot structure 6 supported in rotation by the plate 22 of the second beam 20.

When the three beams 10, 20 and 30 are parallel to one another, they are offset relative to one another. The second beam 20 is ahead of the first beam 10 in the direction of pivoting, and the third beam 30 is ahead of the second beam 20. It should be noted that the inner end of the second endless screw 26 of the second beam 20, at the inner end 20a of the latter, extends beyond the end of the endless screw 16 of the first beam 10, at the outer end of the latter, so that the product conveyed by the second endless screw 26 is picked up by the first endless screw 16. This same arrangement exists between the endless screws 26 and 36 of the second and third beams 20 and 30. The end of the endless screw 36 of the third beam 30, at the outer end 30b of the latter, advantageously extends beyond the plate 32 for reasons which will be explained hereinbelow.

Means 50 are provided for controlling the pivoting of the second beam 20 relative to the first beam 10 when the latter is in motion. In the example considered here (FIGS. 2 and 3), these means 50 consist of an electrical device such as a switch 51 mounted in the control circuit of the motor M'2 of the system 25 driving the second beam 20. This switch 51 is supported by the plate 12 in the vicinity of the articulation pivot 6 for the two beams 10 and 20. The element for triggering this switch consists of a finger 52 mounted at the upper end of the articulation pivot 6.

Conversely, means 55 are provided for controlling the pivoting of the first beam 10 relative to the second beam 20. These means 55 also consist of an electric switch 56 mounted in the control circuit of the motor M'1 of the system 15 driving the first beam 10. This switch 56 is supported by the plate 12 in the vicinity of the articulation pivot 6 of the two beams 10 and 20. The element for triggering this switch 56 is the same as that for the switch 51, namely the finger 52 borne by the articulation pivot 6. In practice, the two electric switches 51 and 56 are situated on each side of the finger 52. In a similar manner, these same control means 50 and 55 are provided between the beams 20 and 30.

Finally, it should be noted that there is a wheel 15a mounted freely at the front of the plate 12 in order to perfect the stability of the beam 10 on the base wall of the silo. In an analogous manner, two free wheels 25a and 35a are also supported, respectively, by the plates 22 and 32 of the two other beams 20 and 30.

The functioning of the device described above is as follows.

Once gravitational emptying has been carried out, the device is started up in order to carry out residual emptying.

In a general manner, the three respective motors M1, M2 and M3 for driving in rotation the endless screws 16, 26 and 36 are started up sequentia the three beams 10, 20 and 30 being substantially in alignment with i.e. parallel to one another. The product conveyed by the endless screw 36 of the third beam 30 is picked up by the endless screw 26 of the second beam 20, then taken up by the endless screw 16 of the first beam 10 and tipped into the discharge opening 3 of the silo.

The drive motors M'1, M'2 and M'3 of the beams are also started up, but as long as the resistance offered by the product opposes the pivoting movement of the beams 10, 20 and 30, the latter remain stationary. In practice, the drive motor M'1 of the wheel 15 of the first beam 10 comes into operation only when the beam is clear of the product, this instant being detected by a photoelectric cell, for example. Once the motor M'1 has been actuated, the motors M'2 and M'3 for driving the beams 20 and 30 are successively started up.

Of course, the beams 10, 20 and 30 do not necessarily pivot simultaneously and at the same angle, because the quantity of product, its structure, etc. vary from one position to another. It is for these various reasons that the devices 50 and 55 for controlling the pivoting of the beams relative to one another have been provided.

If the second beam 20 pivots more quickly than the first beam 10, the radial finger 52 of the control means 50 pivots in a defined direction and comes to act on the electric switch 51, the effect of this being to stop the motor M'2 driving the beam 20. Of course, the motor M'2 is once again started up as soon as the finger no longer acts on the switch 51. Conversely, if the first beam 10 pivots more quickly than the second beam 20, the radial finger 52 of the control means 55 pivots in an opposite direction and comes to act on the electric switch 56, the effect of this being to stop the motor M'1 driving the beam 10. The same control means 50 and 55 provided between the second and third beams 20 and 30 act in a similar manner.

In the case of a cylindrical silo, the three beams 10, 20 and 30 extend overall on a radius of the silo, and it is important to note that the end of the endless screw 36 extending beyond the plate 32 of the third beam 30 comes into the vicinity of the inner side wall of the silo, this making it possible to remove the product stored in this zone.

The device according to the invention is used for the residual emptying of various products, in general cereals, these granular or pulverulent bulk products running off by gravity.

In the case of hemispherical silos, the residual emptying can be entirely carried out with the device according to the invention, the set of endless screws overall extending over a length corresponding to the radius of the silo.

In the case of silos with a noncylindrical crosssection, it is very easy to imagine the whole device being displaced parallel to itself instead of simply having a pivoting movement about a central point. Taking as an example the case of a base with a rectangular cross-section, it suffices, for this purpose, to position the inner end of the first beam in the vicinity of one of the sides of the base of the silo, the set of beams extending over a length corresponding to that of the other side of the base of the silo and to then move the assembly along a discharge opening situated on one side of the base wall of the silo. As a variant, the assembly can be moved in a median line situated half way between two opposite sides of the base of the silo, this discharge opening in this case being situated on this median line.

Of course, the invention is not limited to the embodiments given solely by way of example, and it comprises all the technical equivalents described hereinabove. In particular, the principle of the invention is applicable to a number of beams at least equal to two, and the person skilled in the art can easily imagine, without departing from the scope of the invention, alternatives for the articulation systems between the beams, the systems for controlling the pivoting movement of two consecutive beams by using photoelectric cells for example, and the systems for driving the beams based on chains, for example. The motors for driving the endless screws and the beams can be of the pneumatic or hydraulic type. Finally, certain features, such as the position of the drive motors and the extension of the endless screw of the final beam in the direction of the wall of the silo, are improvements which can be attached to single-beam devices.

We claim:

1. A device for emptying a silo, which has a substantially flat base and at least one discharge opening in said base, of residual granular or pulverulent product stored in the silo; said device comprising:
   (a) a series of generally longitudinally aligned beams situated above the base of the silo and extending parallel to it;
   (b) a pivot structure situated above said discharge opening;
   (c) each beam of the series of beams
      (i) having a first end and a second end and
      (ii) rotatably supporting a respective endless screw extending along that beam between said first and second ends thereof;
   (d) one of said beams, constituting the first beam of the series, being articulated at said first end thereof to said pivot structure for pivotal movement of said first beam over said base of said silo;
   (e) each beam of the series subsequent to said first beam being articulated at its first end to the second end of the next preceding beam of the series for relative pivotal movement between each subsequent beam and the respective next preceding beam;
   (f) a plurality of drive systems, one for each beam and each situated toward said second end of its associated beam, each said drive system including a wheel in rolling contact with and via which said associated beam bears on said base of said silo; and
   (g) a plurality of motor assemblies, one for each beam and each situated toward said second end of its associated beam, each said motor assembly including
      (i) a first motor operatively connected with and driving said endless screw of said associated beam, and
      (ii) a second motor operatively connected with and driving said wheel of said drive system of said associated beam.

2. The device as claimed in claim 1, wherein each said subsequent beam and the respective next preceding beam of said series of beams are arranged, when in their respective starting positions, to be parallel to one another and laterally offset relative to one another, with each said subsequent beam being ahead of said respective next preceding beam in a direction of pivoting, and that end of said endless screw of each said subsequent beam which is proximate to said first end of the latter extends beyond that end of said endless screw of said next preceding beam which is proximate to said second end of the latter, whereby any residual product conveyed by said endless screw of each said subsequent beam is picked up by said endless screw of said respective next preceding beam.

3. The device as claimed in claim 1, wherein respective means associated with said beams are provided for controlling the pivoting of each said subsequent beam relative to said next preceding beam.

4. The device as claimed in claim 3, wherein an auxiliary pivot structure is provided to effect the articulation between each said subsequent beam and the respective next preceding beam, and said means for controlling the pivoting of each said subsequent beam comprises an electrical device in a circuit controlling said second motor of said motor assembly of said subsequent beam, and a radial finger integral with said auxiliary pivot structure of each said subsequent beam and said respective next preceding beam.

5. The device as claimed in claim 3 or 4, wherein respective means associated with said beams are provided for controlling the pivoting of each said next preceding beam relative to said subsequent beam when the latter is stationary.

6. The device as claimed in claim 5, wherein an auxiliary pivot structure is provided to effect the articulation between each said next preceding beam and the respective subsequent beam, and said means for controlling the pivoting of each said next preceding beam comprises an electrical device in a circuit controlling said second motor of said motor assembly of said next preceding beam, and a radial finger integral with said auxiliary pivot structure of each said subsequent beam and next preceding beam.

7. The device as claimed in claim 1, wherein control means are connected with said first motors of said motor assemblies driving said endless screws for activating said first motors one after the other.

8. The device as claimed in 1, wherein said endless screw which is supported by that one of said beams constituting the last beam of the series extends beyond said second end of said last beam.

9. The device as claimed in claim 1, wherein said series of beams is constituted of a first beam and a second beam having overall similar structures, and an auxiliary pivot structure is provided for effecting the articulation of said first beam to said second beam.

10. The device as claimed in claim 9, wherein said first and second beams are arranged, when in their respective starting positions, to be parallel to one another and laterally offset relatively to one another, with said second beam being ahead of said first beam in a direction of pivoting, and that end of said endless screw of said second beam which is proximate to said first end of the latter extends beyond that end of said endless screw of said first beam which is proximate to said second end of the latter, whereby any residual product conveyed by said endless screw of said second beam is picked up by said endless screw of said first beam.

11. The device as claimed in claim 9, wherein respective means associated with said first and second beams are provided for controlling the pivoting of said second beam relative to said first beam.

12. The device as claimed in claim 11, wherein an auxiliary pivot structure is provided to effect the articulation between said first and second beams, and said means for controlling the pivoting of said second beam comprises an electrical device in a circuit controlling said second motor of said motor assembly of said second beam which drives said second beam, and a radial finger integral with said auxiliary pivot structure of said first and second beams.

13. The device as claimed in claim 11 or 12, wherein respective means associated with said first and second beams are provided for controlling the pivoting of said first beam relative to said second beam when the latter is stationary.

14. The device as claimed in claim 13, wherein an auxiliary pivot structure is provided to effect the articulation between said first and second beams, and said means for controlling the pivoting of said first beam comprises an electrical device in a circuit controlling said second motor of said motor assembly of said first beam which drives said first beam, and a radial finger integral with said auxiliary pivot structure of said first and second beams.

15. The device as claimed in claim 9, wherein control means are connected with said first motors of said motor assemblies driving said endless screws of said first and second beams, respectively, for activating said first motors one after the other.

16. The device as claimed in claim 9, wherein said endless screw which is supported by said second beam constituting the last beam of the series extends beyond said second end of said last beam.

17. The device as claimed in claim 1, wherein said series of beams is constituted of a first beam, a second beam and a third beam having overall similar structures, and separate first and second auxiliary pivot structures are provided for effecting, respectively, the articulation of said first beam to said second beam and the articulation of said second beam to said third beam.

18. The device as claimed in claim 17, wherein means are provided for controlling the pivoting of said third beam relative to said second beam.

19. The device as claimed in claim 18, wherein said means for controlling the pivoting of the said third beam comprises an electrical device in a circuit controlling said second motor of said motor assembly of said third beam, and a radial finger integral with said second auxiliary pivot structure.

20. The device as claimed in claim 17 or 18, wherein means are provided for controlling the pivoting of said second beam relative to said third beam.

21. The device as claimed in claim 20, wherein said means for controlling the pivoting of said second beam comprises an electrical device in a circuit controlling said second motor of said motor assembly of said second beam, and a radial finger integral with said first auxiliary pivot structure.

22. The device as claimed in claim 17, wherein said endless screw which is supported by said third beam of the series extends beyond said second end of said third beam.

* * * * *